No. 780,017. PATENTED JAN. 17, 1905.
W. ALBEE.
PIPE THREADING AND CUTTING LATHE.
APPLICATION FILED OCT. 12, 1904.
2 SHEETS—SHEET 1.
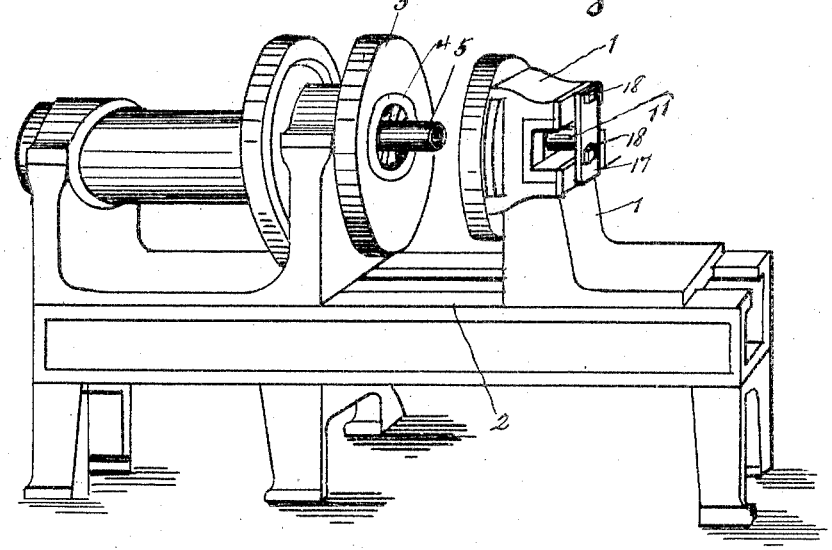
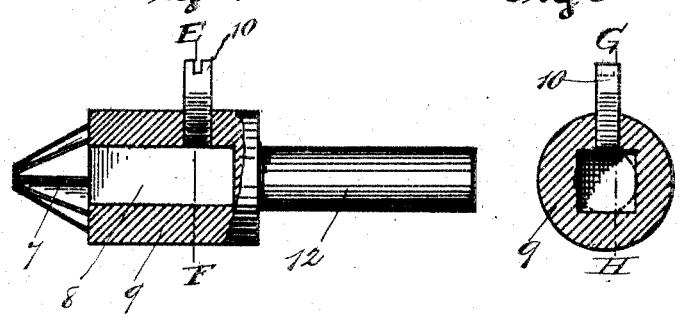
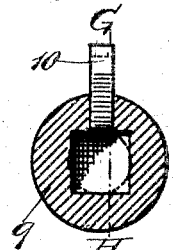
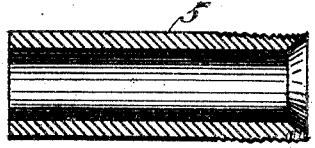
Witnesses
Wm. O. Morck
T. F. Ayers.
Inventor
William Albee
By Thompson Bell
Attorney

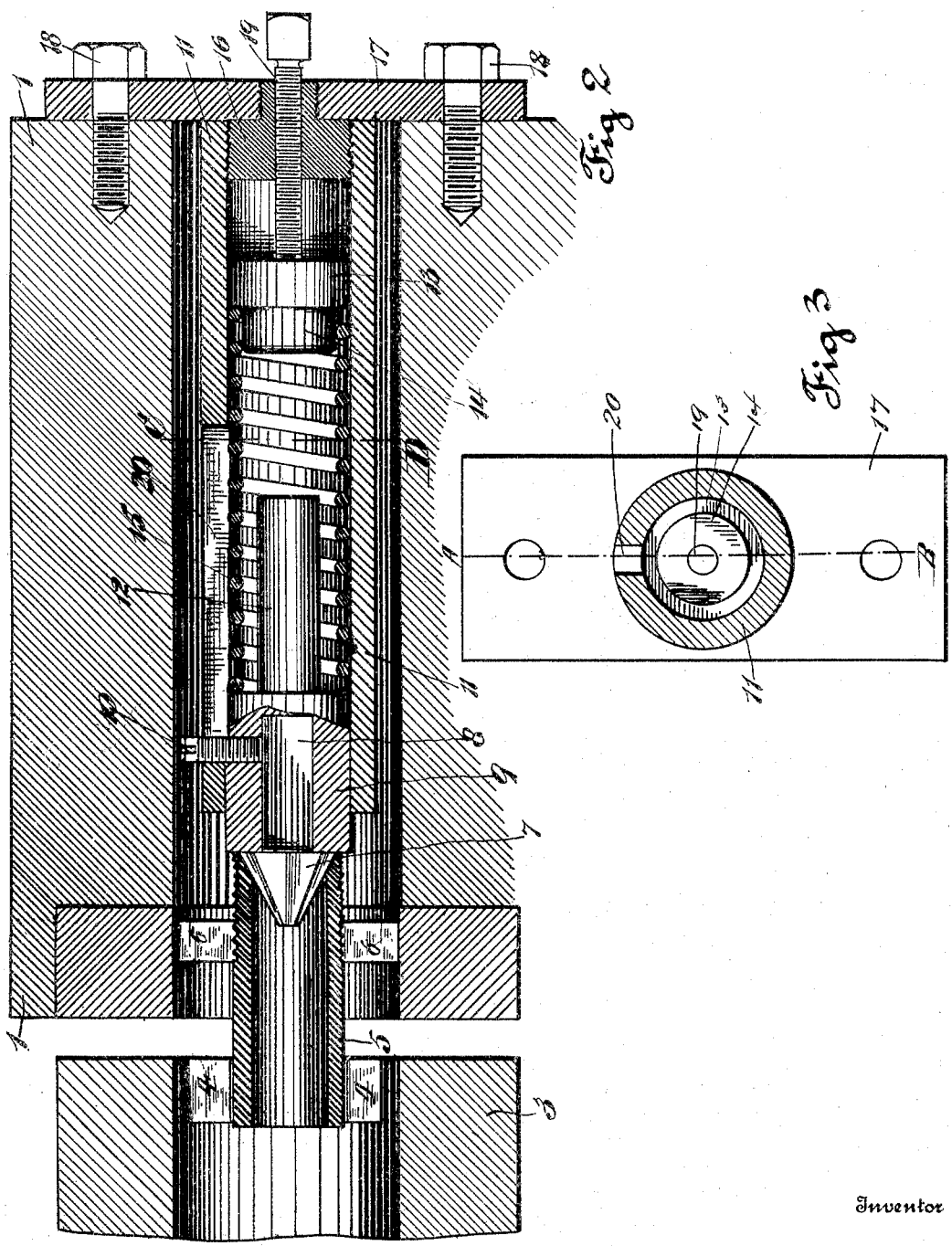

No. 780,017.　　　　　　　　　　　　　　　　　　Patented January 17, 1905.

UNITED STATES PATENT OFFICE.

WILLIAM ALBEE, OF INDIANAPOLIS, INDIANA, ASSIGNOR TO KNIGHT AND JILLSON COMPANY, OF INDIANAPOLIS, INDIANA, A CORPORATION OF INDIANA.

PIPE THREADING AND CUTTING LATHE.

SPECIFICATION forming part of Letters Patent No. 780,017, dated January 17, 1905.

Application filed October 12, 1904. Serial No. 228,232.

*To all whom it may concern:*

Be it known that I, WILLIAM ALBEE, a citizen of the United States, residing at Indianapolis, in the county of Marion and State of Indiana, have invented certain new and useful Improvements in Attachments for Pipe Threading and Cutting Lathes, of which the following is a specification, reference being had therein to the accompanying drawings.

My invention relates to a certain new and useful improved attachment for pipe threading and cutting lathes, as hereinafter described, and particularly pointed out in the claims.

In the usual operation of cutting pipes into short lengths the bores of the pipes where severed were reduced materially by the cutters, which reduced bores at the severed ends of the pipe had to be removed by means of cutters or reamers, which process was accomplished by a separate operation to that of cutting the pipes and threading the ends of the pipes.

The object of this invention is to provide a means whereby the reduced bore of the cut pipe at the point of severance will be removed simultaneously with the operation of threading the pipe.

A further object is to provide means whereby when a sufficient amount of the bur in the pipe is removed the bur removing and reaming tool will automatically recede or yield to permit the end of the pipe to be threaded the required amount.

I attain these objects by means of the attachment for pipe-threading lathes illustrated in the accompanying drawings, in which similar numerals of reference designate like parts throughout the several views.

Figure 1 is a perspective view of a pipe-lathe, showing my attachment applied to the fixed die-carrying head thereof. Fig. 2 is an enlarged longitudinal sectional view of the device applied to the fixed die-carrying head of the pipe-cutting lathe and taken through the line A B. (See Fig. 3.) Fig. 3 is an end sectional elevational view of the same, taken through the line C D. (See Fig. 2.) Fig. 4 is an enlarged detail sectional view of the reaming-head, taken through the line G H. (See Fig. 5.) Fig. 5 is a transverse sectional view of the same, taken through the line E F. (See Fig. 4.) Fig. 6 is a longitudinal sectional detail view of a pipe, showing the pipe after being cut to length and showing the bur at the bore of the reduced severed end thereof; and Fig. 7 is a detail similar view of a pipe, showing the same completed or finished, the threads being cut and the bur removed from the bore at the severed end therof.

The die-carrying head 1 of the pipe threading and cutting lathe is firmly secured on the ways 2, and the revoluble vise-head 3 is provided with the vise or grip jaws 4, which engage the pipe 5 to hold it firmly while being rotated to be cut or undergoing the operation of threading. The die-carrying head 1 may be of the usual or any type of die-carrying head used in pipe threading and cutting lathes and is provided with the thread-cutting dies 6, which thread-cutting dies are supported and maintained in their proper position to cut threads of the proper diameter on the pipe to be threaded.

A tapered reamer 7 is provided with the square stem 8 to prevent its rotation, which is accurately fitted into the square bore of the reamer-carrying head 9, and the same is held securely in said bore by the guiding set-screw or pin 10. The reamer-carrying head 9 is cylindrical and fits into the bore of the reamer-carrying sleeve 11 to slide longitudinally therein a limited extent, and the cylindrical stem or reduced projecting end 12 extends from the back of the said head 9 to form a stop whereby the extent of backward movement of the head 9 is limited. The end of the stop 12 contacts with the head 13 when the head 9 has traversed its full extent.

An adjustable head 13 accurately fits in the bore of the sleeve 11 to be adjusted or moved longitudinally therein, and the same is provided with a reduced end 14, which fits into the end coils of the coil-spring 15. The rear end of the sleeve 11 is provided with the closing-plug 16, which is screwed or otherwise permanently secured in the end of the reamer-carrying sleeve 11, and the same has its end reduced and threaded to be securely screwed into the cross-head 17, which cross-head is securely bolted to the fixed head 1 by the bolts 18 to securely and firmly maintain said sleeve 11 in its fixed position with its axis or longitudinal center concentric with the center of the die-carrying head 1 and concentric with the axis of rotation of the head 3.

An adjusting set-screw 19 is screwed into the plug 16, and the same is provided for the purpose of moving or adjusting the head 13 to cause the head 9 to project a greater or lesser degree out of the open end of the reamer-carrying head 11 in order that the reamer 7 may begin to operate to counterbore the pipe 5 earlier or later during the time of the operation of threading the pipe. Thus when it is only necessary to thread the end of the pipe a very short distance of its length in order that the bur be reduced from the end of the bore of the pipe simultaneously with the operation of cutting or threading an earlier contact of the end of the pipe with the reamer must necessarily take place. This is readily accomplished by screwing the set-screw 19 in order to bring the reamer 7 nearer to the dies 6, and vice versa when a longer thread is required to be cut on the end of the pipe.

In order to prevent the head 9 turning in the sleeve 11, I provide the longitudinally-extending guide-slot 20 in the sleeve 11, which slot is adapted to receive the projecting prolonged end of the set-screw 10, which latter is capable of sliding freely in said slot, and said slot is of a length sufficient to permit the head 9 to travel its full extent.

The application of the device to a pipe threading and cutting lathe and the manner of operating the same will be better understood from the following description.

The pipes to be operated upon are first cut to the desired length, and said pipes are inserted one by one between the vise or gripping-jaws 4 of the revoluble pipe-carrying head 3, and said pipe 5 is fed up to and between the thread-cutting dies 6 of the fixed die-carrying head 1 to be threaded. Immediately the operation of cutting the threads in the end of the revolving pipe begins, or very soon thereafter, the burred end bore of the pipe comes in contact with the reamer 7, which reamer being stationary operates to remove the bur from the interior end portion of the revolving pipe. Immediately the requisite amount of material or bur has been removed from the interior of the end of the bore of the pipe the end of the pipe abuts or shoulders the end of the head 9, and as the process of cutting the threads in the pipe continues the end of said pipe is forced against said head, which latter recedes or yields, owing to the resiliency of the coil-spring 15, and said head continues to recede until the pipe is fully threaded. The threading process being completed, the dies 6 are thrown out of engagement with the pipe 5 and the revoluble head 3 is caused to recede from the die-carrying head 1, the jaws 4 opened, and the finished pipe 5 removed, and thus the operation may be continued.

Having thus fully described this my invention, what I claim as new and useful, and desire to cover by Letters Patent of the United States therefor, is—

1. In a pipe threading and cutting lathe, the combination with a revoluble pipe-carrying head and a fixed die-carrying head, of a fixed reamer-carrying sleeve extending centrally within said die-carrying head, a fixed reamer cutting-tool supported by said sleeve, and an adjustable head, and a spring between said adjustable head and said reamer, means for adjusting said adjustable head in a longitudinal direction in said sleeve.

2. In a pipe threading and cutting lathe, the combination with a revoluble pipe-carrying head and a fixed die-carrying head, of a fixed reamer-carrying sleeve extending centrally within said die-carrying head, a reamer, a reamer-carrying head fitted in the bore of said sleeve, an adjustable head adapted to be moved longitudinally within said sleeve, a spring situated within said sleeve between said reamer-carrying head and said adjustable head and means for preventing the rotation of said reamer and said reamer-carrying head.

3. In a pipe threading and cutting lathe, the combination with a revoluble pipe-carrying head and a fixed die-carrying head, of a fixed reamer-carrying sleeve extending centrally within said die-carrying head, a reamer, a reamer-carrying head fitted in the bore of said sleeve, said sleeve having a longitudinally-extending guide-slot, a guiding screw or pin projecting from said reamer-carrying head through said slot, an adjustable head adapted to be moved longitudinally within said sleeve, and a spring situated within said sleeve between said reamer-carrying head and said adjustable head.

In testimony whereof I affix my signature in presence of two witnesses.

WILLIAM ALBEE.

Witnesses:
  THOMPSON R. BELL,
  W. W. CRITCHLOW.